US012443917B2

United States Patent
Kuroda et al.

(10) Patent No.: US 12,443,917 B2
(45) Date of Patent: Oct. 14, 2025

(54) INFORMATION PROCESSING SYSTEM, OCCUPANCY RATE CALCULATION METHOD, AND NON-TRANSITORY COMPUTER READABLE MEMORY

(71) Applicant: Rakuten Group, Inc., Tokyo (JP)

(72) Inventors: Ken Kuroda, Tokyo (JP); Chisa Yamamoto, Tokyo (JP); Manabu Toraishi, Tokyo (JP); Shuhei Shimamura, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 278 days.

(21) Appl. No.: 17/973,978

(22) Filed: Oct. 26, 2022

(65) Prior Publication Data

US 2024/0144169 A1 May 2, 2024

(30) Foreign Application Priority Data

Oct. 27, 2021 (JP) .................. 2021-175539

(51) Int. Cl.
*G06Q 10/087* (2023.01)
(52) U.S. Cl.
CPC .................. *G06Q 10/087* (2013.01)
(58) Field of Classification Search
CPC .................................................. G06Q 10/087
See application file for complete search history.

(56) References Cited

U.S. PATENT DOCUMENTS

| 10,796,278 | B1 * | 10/2020 | Wintz | ............... G06Q 10/0833 |
| 2003/0216969 | A1 * | 11/2003 | Bauer | ................. G06K 17/00 |
| | | | | 705/22 |
| 2021/0090193 | A1 * | 3/2021 | Cui | ....................... G06Q 10/08 |

FOREIGN PATENT DOCUMENTS

| JP | 5-178403 | A | | 7/1993 |
| JP | 2007-45552 | A | | 2/2007 |
| JP | 2007045552 | A | * | 2/2007 |
| TW | 202305678 | A | | 2/2023 |
| WO | 2017/168678 | A1 | | 10/2017 |
| WO | 2022/269331 | A1 | | 12/2022 |

OTHER PUBLICATIONS

Extended European Search Report issued Mar. 7, 2023 in European Application No. 22203631.1.

* cited by examiner

*Primary Examiner* — A. Hunter Wilder
*Assistant Examiner* — Joseph M Mutschler
(74) *Attorney, Agent, or Firm* — Sughrue Mion, PLLC

(57) ABSTRACT

The shelf tier management system S acquires size information of a shelf tier and size information of an accommodated item that has been accommodated in the shelf tier, obtains a occupancy rate of the accommodated item in the shelf tier on the basis of at least the size information of the shelf tier and the size information of the accommodated item, and calculates a corrected occupancy rate by correcting the occupancy rate with a correction coefficient according to the accommodated item.

6 Claims, 9 Drawing Sheets

FIG. 5B

| | SHELF TIER : 0001001 |
|---|---|
| UPPER TIER | OCCUPANCY RATE : 90% <br> CORRECTED OCCUPANCY RATE : 75% |
| UPPER TIER | OCCUPANCY RATE : 98% <br> CORRECTED OCCUPANCY RATE : 80% |
| MIDDLE TIER | OCCUPANCY RATE : 95% <br> CORRECTED OCCUPANCY RATE : 93% |
| MIDDLE TIER | OCCUPANCY RATE : 95% <br> CORRECTED OCCUPANCY RATE : 93% |
| LOWER TIER | OCCUPANCY RATE : 5% <br> CORRECTED OCCUPANCY RATE : 3% |
| LOWER TIER | OCCUPANCY RATE : 0% <br> CORRECTED OCCUPANCY RATE : 0% |

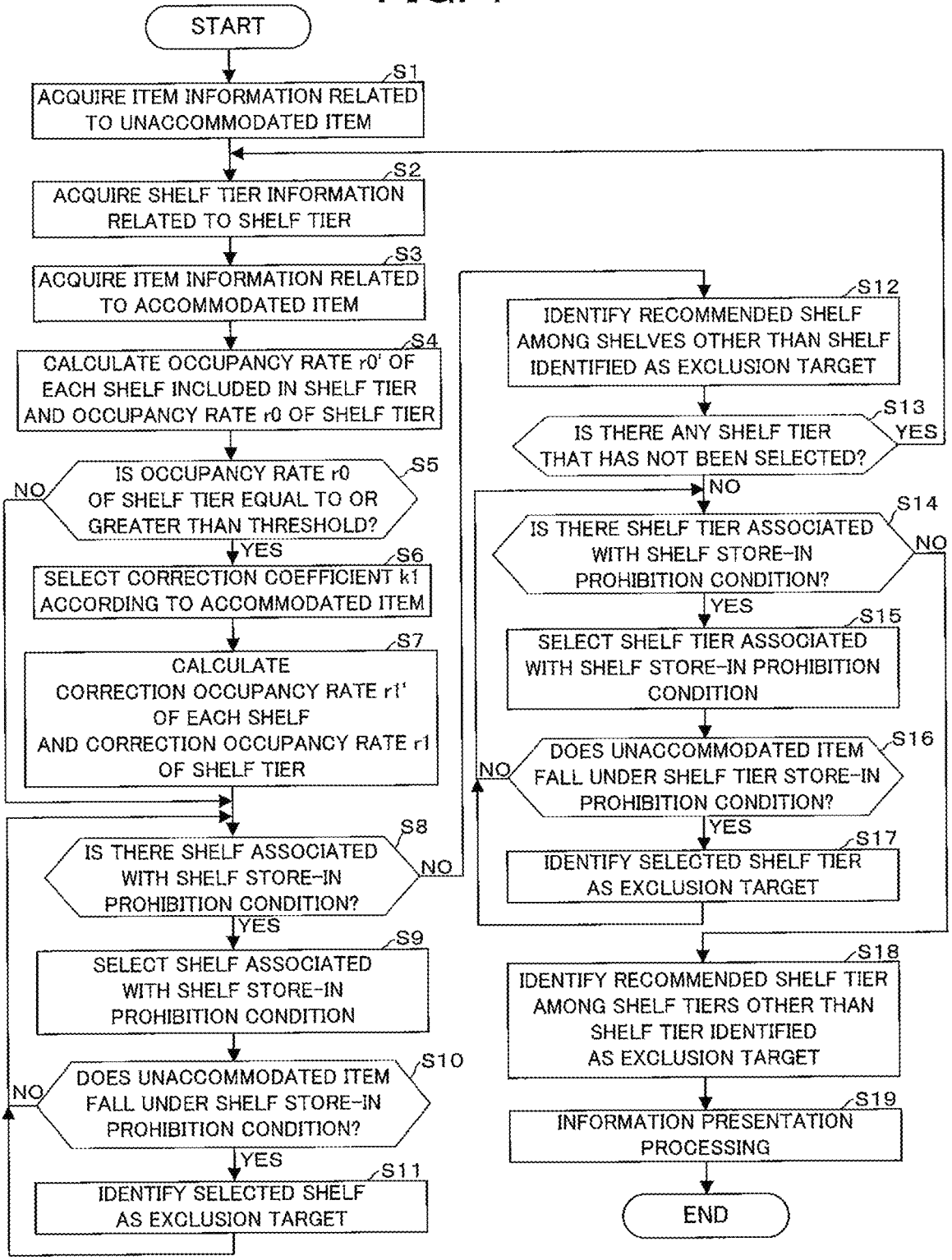

INFORMATION PROCESSING SYSTEM, OCCUPANCY RATE CALCULATION METHOD, AND NON-TRANSITORY COMPUTER READABLE MEMORY

CROSS REFERENCE TO RELATED APPLICATION

This application claims priority from Japanese Patent Application No. 2021-175539 which was filed on Oct. 27, 2021, the disclosure of which is herein incorporated by reference in its entirety.

TECHNICAL FIELD

One or more embodiments of the present invention relates to a technical field including a method of calculating an occupancy rate of items on a shelf on which the items are accommodated and the like.

RELATED ART

Conventionally, for a warehouse in which a storage rack having a plurality of shelves capable of accommodating articles (items) is arranged, a technique of calculating a vacancy rate of each shelf on the basis of a volumetric capacity of each shelf, a volume of an article accommodated on each shelf, and a volume of an article to be stored is known (for example, paragraph 0032 of JP 2007-045552 A). According to such a technique, not only a shelf on which no article is accommodated but also a shelf on which articles are accommodated can be regarded as an empty shelf as long as the shelf has a sufficient vacancy rate for accommodating the article to be stored, so that it is possible to provide more options of shelves in which the article to be stored can be stored.

However, in the conventional technique, it is difficult to calculate an appropriate occupancy rate according to items accommodated on a shelf, because a degree of being regarded as a vacancy varies depending on the items, for example, items whose volume changes such as clothes, items that are not preferable to be accommodated on the shelf in a large volume, and the like.

Therefore, one or more embodiments of the present invention are directed to providing an information processing system, an occupancy rate calculation method, and a program capable of calculating an appropriate occupancy rate according to the item accommodated in a shelf tier.

SUMMARY

In response to the above issue, an information processing system includes: at least one memory configured to store program code; and at least one processor configured to access the program code and operate as instructed by the program code. The program code includes: first acquisition code configured to cause the at least one processor to acquire size information of a shelf tier; second acquisition code configured to cause the at least one processor to acquire size information of an accommodated item that is accommodated in the shelf tier; and calculation code configured to cause the at least one processor to obtain an occupancy rate of the accommodated item in the shelf tier on a basis of at least the size information of the shelf tier and the size information of the accommodated item, and to calculate a corrected occupancy rate by correcting the occupancy rate with a correction coefficient according to the accommodated item.

The calculation code may cause the at least one processor to calculate the corrected occupancy rate in a case where the occupancy rate is equal to or greater than a threshold.

The program code may further include first presentation code configured to cause the at least one processor to present the corrected occupancy rate to a worker who performs work of accommodating, in the shelf tier, an unaccommodated item that is not yet accommodated in the shelf tier before the work.

The first presentation code may cause the at least one processor to present the occupancy rate and the corrected occupancy rate to the worker in a distinguishable display mode.

The program code may further include second presentation code configured to cause the at least one processor to present an area map, to a worker who performs work of accommodating, in the shelf tiers, the unaccommodated item that has not yet been accommodated in the shelf tiers before the work. In the area map, the corrected occupancy rate calculated for each of a plurality of the shelf tiers installed in a predetermined area or a display object according to the corrected occupancy rate is associated with an installation position of each of the shelf tiers.

The calculation code may cause the at least one processor to select the correction coefficient according to the accommodated item on a basis of an item category or an item attribute of the accommodated item, and to correct the occupancy rate with the selected correction coefficient.

The calculation code may cause the at least one processor to calculate the corrected occupancy rate for each of a plurality of shelf tiers installed in a predetermined area. The program code may further include first identifying code configured to cause the at least one processor to identify, among the plurality of shelf tiers, a recommended shelf tier to be recommended to accommodate the unaccommodated item that is not yet accommodated in the shelf tiers, on a basis of the corrected occupancy rate.

The first identifying code may cause the at least one processor to determine whether the unaccommodated item falls under a shelf store-in prohibition condition associated with any of the shelf tiers on a basis of item information related to the unaccommodated item, and to identify the recommended shelf tier by excluding a shelf tier for which the unaccommodated item is determined to fall under the shelf store-in prohibition condition.

The first identifying code may cause the at least one processor to identify the recommended shelf tier on a basis of the corrected occupancy rate and an item turnover rate that is based on a record of shipping the accommodated item from the shelf tier.

The program code may further include third presentation code configured to cause the at least one processor to present information on the recommended shelf tier to a worker who performs work of accommodating the unaccommodated item in the shelf tier before the work.

The shelf tier may include a plurality of shelves. The calculation code may cause the at least one processor to calculate the corrected occupancy rate for each of the shelves. The program code may further include second identifying code configured to cause the at least one processor to identify, among the plurality of shelves, a recommended shelf to be recommended to accommodate the unaccommodated item that is not yet accommodated in the shelf tier, on a basis of the corrected occupancy rate.

The second identifying code may cause the at least one processor to determine whether or not the unaccommodated item falls under a shelf store-in prohibition condition associated with any of the shelves on a basis of the item information related to the unaccommodated item, and to identify the recommended shelf by excluding a shelf for which the unaccommodated item is determined to fall under the shelf store-in prohibition condition.

The second identifying code may cause the at least one processor to identify the recommended shelf on a basis of the corrected occupancy rate and an item turnover rate that is based on a record of shipping the accommodated item from the shelf.

The program code may further include fourth presentation code configured to cause the at least one processor to present information on the recommended shelf to a worker who performs work of accommodating the unaccommodated item in the shelf tiers before the work.

An occupancy rate calculation method executed by one or a plurality of computers: acquiring size information of a shelf tier, includes: acquiring size information of an accommodated item that is accommodated in the shelf tier; obtaining an occupancy rate of the accommodated item in the shelf tier on a basis of at least the size information of the shelf tier and the size information of the accommodated item, and correcting the occupancy rate with a correction coefficient according to the accommodated item, to calculate a corrected occupancy rate.

A non-transitory computer readable memory has stored thereon a program configured to cause a computer to: acquire size information of a shelf tier; acquire size information of an accommodated item that is accommodated in the shelf tier; and obtain an occupancy rate of the accommodated item in the shelf tier on a basis of at least the size information of the shelf tier and the size information of the accommodated item, and calculate a corrected occupancy rate by correcting the occupancy rate with a correction coefficient according to the accommodated item.

BRIEF DESCRIPTION OF THE DRAWINGS

FIG. 5B is a diagram illustrating a display example of information on shelves.

FIG. 7 is a flowchart illustrating an example of processing of the control unit 23 in the shelf tier management server 2.

DETAILED DESCRIPTION

The following describes one or more embodiments of the present invention with reference to the drawings. The following embodiment is an embodiment in a case where the present invention is applied to a shelf tier management system that manages shelf tiers capable of accommodating items.

[1. Configuration and Functional Overview of Shelf Tier Management System S]

Figure 1:
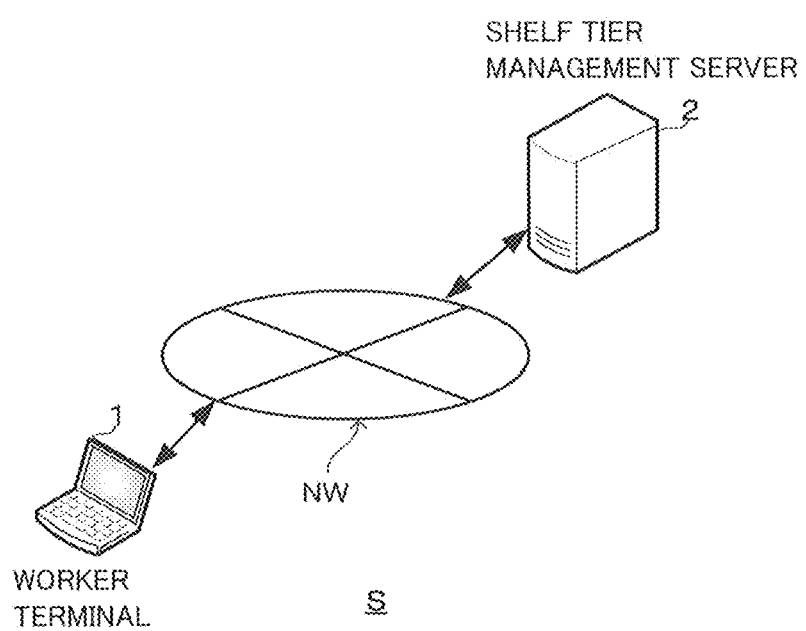
FIG. 1 is a diagram illustrating a schematic configuration example of a shelf tier management system S.

First, a configuration and a functional overview of a shelf tier management system S according to the present embodiment will be described with reference to FIG. 1 and the like. FIG. 1 is a diagram illustrating a schematic configuration example of the shelf tier management system S. As illustrated in FIG. 1, the shelf tier management system S includes a worker terminal 1, a shelf tier management server 2, and the like. The worker terminal 1 and the shelf tier management server 2 are both connected to a network NW. The network NW includes, for example, the Internet, a mobile communication network, a radio base station thereof, and the like. In the present embodiment, a warehouse that accommodates items of an exhibitor (for example, a seller or a store) that exhibits (sells) the items on an online shopping site that performs electronic commerce on the Internet will be described as an example. The items may be, for example, products, merchandises, commodities, or articles. In the present embodiment, for example, it is assumed that a plurality of shelf tiers are installed (for example, they are arranged side by side) in a predetermined area (for example, first floor) in the warehouse where the items are received and shipped. For example, inside of the warehouse is provided with a receiving place where the items arrive from outside of the warehouse and a shipping place where the items are shipped to the outside of the warehouse. Incidentally, in the present embodiment, a case where one shelf tier includes a plurality of shelves will be described as an example, but one shelf tier may be composed of one shelf.

[1-1. Configuration and Functions of Worker Terminal 1]

Figure 2:
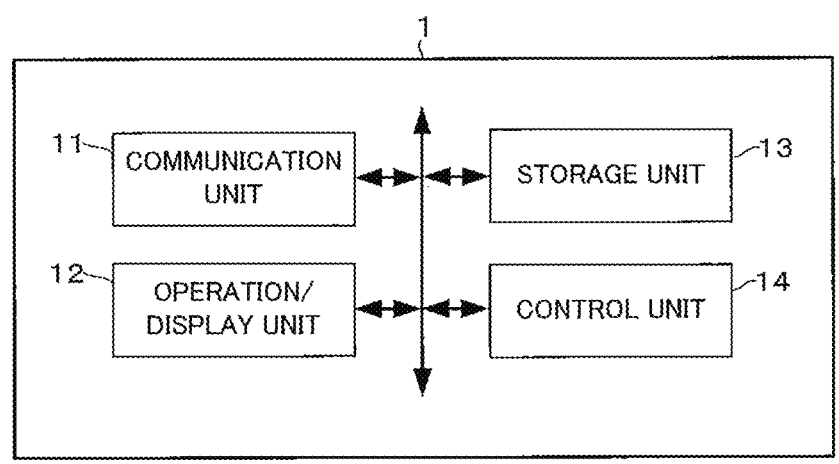
FIG. 2 is a block diagram illustrating a schematic configuration example of a worker terminal 1.

Next, a configuration and functions of the worker terminal 1 will be described. The worker terminal 1 is a portable terminal used by a worker. The worker may perform a work of taking out an item being actually accommodated in a shelf tier from the shelf tier (hereinafter, this item is referred to as an "accommodated item"). Moreover, the worker may perform work of accommodating an item not yet being accommodated in the shelf tier in the shelf tier (hereinafter, this item is referred to as an "unaccommodated item"). FIG. 2 is a block diagram illustrating a schematic configuration example of the worker terminal 1. The worker terminal 1 includes a communication unit 11, an operation/display unit 12, a storage unit 13, a control unit 14, and the like. The communication unit 11 has a function of connecting to the network NW. The operation/display unit 12 has a function of receiving an operation instruction from a user and a function of displaying a working screen. The storage unit 13 stores programs such as an operating system (OS) and an application. The control unit 14 includes at least one CPU (Central Processing Unit), a ROM (Read Only Memory), a RAM (Random Access Memory), and the like, and performs various processes according to the programs stored in the storage unit 13. For example, the control unit 14 causes the operation/display unit 12 to display information on the shelf tier on the working screen. The working screen is a user interface through which the worker can visually confirm the information on the shelf tier. Incidentally, the information on the shelf tier is transmitted from the shelf tier management server 2 and received by the communication unit 11.

[1-2. Configuration and Functions of Shelf Tier Management Server 2]

Figure 3A:
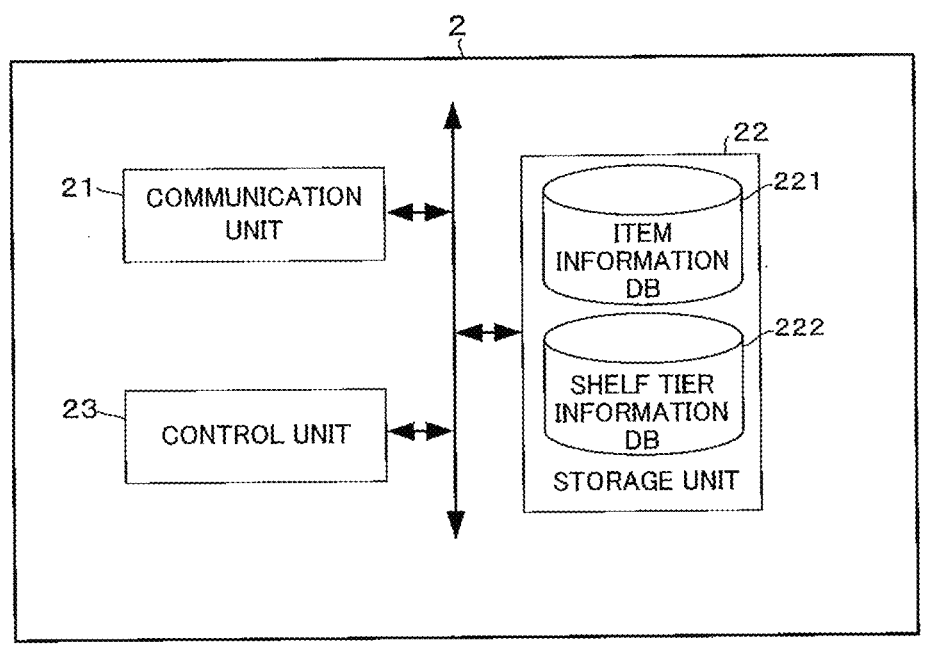
FIG. 3A is a block diagram illustrating a schematic configuration example of a shelf tier management server 2.

Next, a configuration and functions of the shelf tier management server 2 will be described. The shelf tier management server 2 includes one or a plurality of server computers. FIG. 3A is a block diagram illustrating a schematic configuration example of the shelf tier management server 2. As illustrated in FIG. 3A, the shelf tier management server 2 includes a communication unit 21, a storage unit 22, a control unit 23, and the like. The communication unit 21 has a function of connecting to the network NW. The storage unit 22 includes, for example, a hard disk drive and the like, and stores programs such as an operating system and an application. Moreover, in the storage unit 22, an item information database (DB) 221, a shelf tier information database (DB) 222, or the like are constructed.

The item information database 221 is a database for storing item information related to the items. In the item information database 221, for example, an item ID, an item category, an item attribute (item characteristic), item size information, a weight, an item name, exhibitor information, and the like are stored in association with each item. Here, the item ID is identification information for recognizing (identifying) the item. Examples of the item categories include books, clothes, hats, shoes, umbrellas, stationery, electrical appliances, daily necessities, foods, and the like. The item categories may be further divided into lower sub categories. Examples of the item attributes include that the item or its packaging (for example, a packaging container) is soft, the item or its packaging is hard, the item or its packaging is not easily damaged (hard to break), and the item or its packaging is easily scratched (damaged). The item size information is represented by, for example, dimensions of three sides (height Hi×width Wi×depth Di) of the item. Incidentally, the item size of the clothes is preferably dimensions of three sides in a folded state. The item name may be a name printed on the item or its packaging. However, the item name may include an item feature. The exhibitor information includes, for example, a exhibitor ID for recognizing a exhibitor (for example, a store) that has sold an item.

The shelf tier information database 222 is a database for storing shelf tier information related to shelf tiers. Incidentally, the shelf tier information database 222 may be provided for each warehouse or area. In the shelf tier information database 222, the following are stored in association with each shelf tier (a shelf tier ID): installation position information of the shelf tier, a shelf ID of each shelf included in the shelf tier, size information of each shelf, position information of each shelf, the item IDs of accommodated items that are accommodated in each shelf, the number of the accommodated items, a record (i.e., track record) of shipping the accommodated items from each shelf, and the like. Here, the shelf ID is identification information for recognizing (identifying) a shelf, and the shelf tier ID is identification information for identifying a shelf tier. The size information of the shelf is represented by, for example, dimensions of three sides (height Hr×width Wr×depth Dr) of the shelf. Among the dimensions of three sides of shelves, a shelf height may be different for each shelf. The size information of the shelf tier is identified from the size information of each shelf included in the shelf tier. The installation position information of the shelf tier indicates the installation position of the shelf tier in the predetermined area, and may be represented by east, west, north, south, or may be represented by a name of a zone distinguished in the area. The position information of the shelf indicates the position of the shelf in the shelf tier, and is represented as, for example, an upper tier, a middle tier, or a lower tier.

Figure 4:
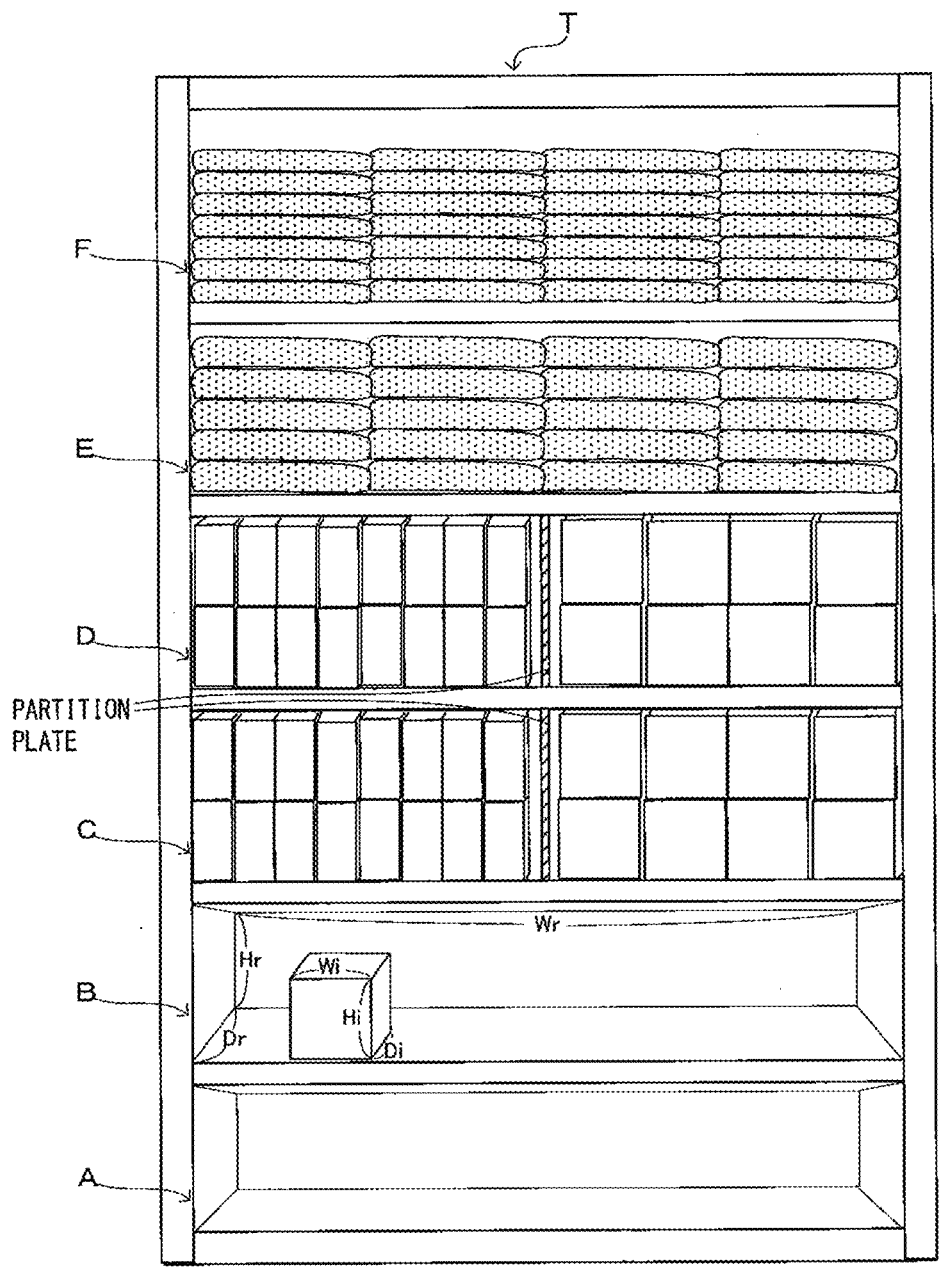
FIG. 4 is a diagram illustrating an example of a shelf tier as viewed from the front.

FIG. 4 is a diagram illustrating an example of the shelf tier as viewed from the front. In the example of FIG. 4, a shelf tier T includes six tiers of shelves from a tier A to a tier F, and the tier F and the tier E are the upper tiers (the tier F is the uppermost tier), the tier D and the tier C are the middle tiers, and the tier A and the tier B are the lower tiers (the tier A is the lowermost tier). In each shelf, an opening portion through which an item is taken in and out is referred to as a frontage. However, a space extending from the opening portion in a depth direction may be also referred to as a frontage. In a case where one shelf is divided by a partition plate as in the case of the shelves of the tier C and the tier D illustrated in FIG. 4, one shelf has a plurality of frontages. Such a frontage may be assigned a frontage number. In this case, the item ID of the accommodated item that has been accommodated from the frontage may be stored in the shelf tier information database 222 in association with the frontage number. Furthermore, size information of the frontage (that is, size information of the space extending from the opening portion in the depth direction) may be stored in the shelf tier information database 222 in association with the item ID of the accommodated item that has been accommodated from the frontage. Incidentally, the accommodated item does not necessarily fit in the frontage, and may protrude from the frontage.

The record of shipping the accommodated items from the shelf indicates, for example, the number of times the accommodated items were shipped from the shelf during a past predetermined period (for example, 30 days). Moreover, in the shelf tier information database 222, the shelf ID of any shelf among the plurality of shelves may be stored in association with shelf store-in prohibition conditions. The shelf store-in prohibition conditions are criteria for an item prohibited from being accommodated on a shelf. For example, the shelf store-in prohibition conditions associated with the upper-tier shelves are defined to prohibit the accommodation of items having a weight equal to or greater than a threshold (for example, 5 kg). This is because the burden on the worker increases when the worker accommodates heavy items into the upper-tier shelves. Moreover, the shelf store-in prohibition conditions associated with any shelf are defined to prohibit the accommodation of items from exhibitors other than a specific exhibitor identified by a specific exhibitor ID. This is because it is desirable that the accommodated items of the specific exhibitor are collectively accommodated to some extent in the shelf tier.

Incidentally, the shelf store-in prohibition conditions may be stored in association with the shelf tier ID of any shelf tier among a plurality of shelf tiers installed in the predetermined area. Such shelf store-in prohibition conditions are criteria for items prohibited from being accommodated into the shelf tier. For example, the shelf store-in prohibition conditions associated with any shelf tier are defined to prohibit the accommodation of items from exhibitors other than a specific exhibitor identified by a specific exhibitor ID. This is because it is desirable that the accommodated items of the specific exhibitor are collectively accommodated to some extent for each of a plurality of zones distinguished in the area where the shelf tiers are installed.

The control unit 23 as a computer includes at least one CPU, a ROM, a RAM, and the like, and performs various processes according to the programs (program code) stored in the storage unit 22 or the non-transitory computer readable memory. The CPU (an example of processor) is configured to access the program code stored in the storage unit 22 or the memory and operate as instructed by the program code. The program code includes: first acquisition code configured to cause the CPU to acquire size information of a shelf tier; second acquisition code configured to cause the CPU to acquire size information of an accommodated item that is accommodated in the shelf tier; and calculation code configured to cause the CPU to obtain an occupancy rate of the accommodated item in the shelf tier on a basis of at least the size information of the shelf tier and the size information of the accommodated item, and to calculate a corrected occupancy rate by correcting the occupancy rate with a correction coefficient according to the accommodated item. The program code may further include first presentation code configured to cause the CPU to present the corrected occupancy rate to a worker who performs work of accommodating, in the shelf tier, an unaccommodated item that is not yet accommodated in the shelf tier before the work. The program code may further include second presentation code configured to cause the CPU to present the area map, to a worker who performs work of accommodating, in the shelf tiers, the unaccommodated item that has not yet been accommodated in the shelf tiers before the work. The program code further include first identifying code configured to cause the CPU to identify, among the plurality of shelf tiers, a recommended shelf tier to be recommended to accommodate the unaccommodated item that is not yet accommodated in the shelf tiers, on a basis of the corrected occupancy rate. The program code may further include third presentation code configured to cause the CPU to present information on the recommended shelf tier to a worker who performs work of accommodating the unaccommodated item in the shelf tier before the work. The program code may further include second identifying code configured to cause the CPU to identify, among the plurality of shelves, a recommended shelf to be recommended to accommodate the unaccommodated item that is not yet accommodated in the shelf tier, on a basis of the corrected occupancy rate. The program code may further include fourth presentation code configured to cause the CPU to present information on the recommended shelf to a worker who performs work of accommodating the unaccommodated item in the shelf tiers before the work.

Figure 3B:
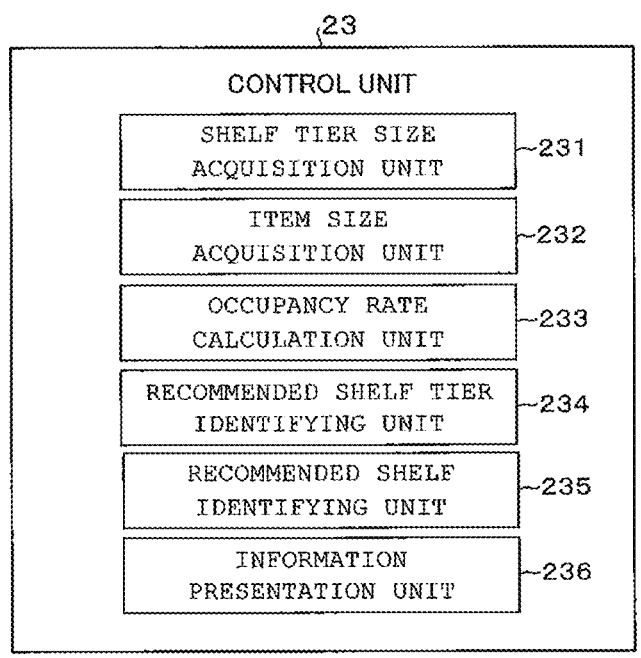
FIG. 3B is a diagram illustrating an example of functional blocks in a control unit 23.

FIG. 3B is a diagram illustrating an example of functional blocks in the control unit 23. In various processes, as illustrated in FIG. 3B, the control unit 23 functions as a shelf tier size acquisition unit 231, an item size acquisition unit 232, an occupancy rate calculation unit 233, a recommended shelf tier identifying unit 234, a recommended shelf identifying unit 235, an information presentation unit 236, and the like in accordance with the program code stored in, for example, the storage unit 22 or the memory.

For example, as the size information of a shelf tier installed in the warehouse, the shelf tier size acquisition unit 231 acquires the size information of each shelf included in the shelf tier from the shelf tier information database 222. The size information may be acquired for a plurality of shelf tiers. The item size acquisition unit 232 acquires, from the item information database 221, size information of the accommodated item being accommodated in the shelf tier whose size information has been acquired by the shelf tier size acquisition unit 231. For example, the item ID of the accommodated item that has been accommodated in each shelf included in the shelf tier is acquired from the shelf tier information database 222. The item size information associated with the acquired item ID is acquired from the item information database 221.

The occupancy rate calculation unit 233 first obtains an occupancy rate r0 of the accommodated item in the shelf tier (also referred to as an occupancy rate of the shelf tier) on the basis of the "size information of the shelf tier" and the "size information of the accommodated item" acquired by the shelf tier size acquisition unit 231 and the item size acquisition unit 232. In a case where a plurality of shelf tiers are installed in the predetermined area, the occupancy rate r0 may be obtained for each of the plurality of shelf tiers. In calculating the occupancy rate r0, for example, the occupancy rate calculation unit 233 calculates a volumetric capacity of each shelf from the size information of each shelf, and calculates a sum of the calculated volumetric capacity of the shelves as a total volumetric capacity Vr of the shelf tier. Moreover, the occupancy rate calculation unit 233 calculates a volume Vi of the accommodated item from the size information of the accommodated item. When there are a plurality of accommodated items, the occupancy rate calculation unit 233 calculates a sum of volumes calculated from the size information of each accommodated item as a volume (total volume) Vi of the accommodated items. Here, in a case where a plurality of accommodated items having the same item ID has been accommodated, the total volume of the accommodated items may be calculated by multiplying the volume of the accommodated item by the number of the accommodated items.

Then, the occupancy rate calculation unit 233 divides the volume Vi of the accommodated item by the volumetric capacity Vr of the shelf tier to obtain the occupancy rate r0 (=Vi/Vr) of the accommodated item in the shelf tier. Here, the occupancy rate calculation unit 233 may obtain the occupancy rate r0 (=Vi/Vr*k0) of the accommodated item in the shelf tier by dividing the volume Vi of the accommodated item by the volumetric capacity Vr multiplied by a correction coefficient k0 for matching with the actual volume of the shelf tier. The correction coefficient k0 is common among different accommodated items, and is set to, for example, about 0.9. Incidentally, the occupancy rate calculation unit 233 may obtain an occupancy rate r0' of the accommodated item on the shelf (also referred to as an occupancy rate r0' of the shelf) for each shelf by dividing the volume of the accommodated item being accommodated on the shelf by the volumetric capacity of the shelf. In this case, for example, an average value or the maximum value of the occupancy rates r0' of all shelves included in the shelf tier is the occupancy rate r0 of the shelf tier.

Next, the occupancy rate calculation unit 233 calculates a corrected occupancy rate r1 (=k1×r0) by correcting the obtained occupancy rate r0 with a correction coefficient k1 according to the accommodated item. In a case where a plurality of shelf tiers are installed in the predetermined area, the corrected occupancy rate r1 may be calculated for each of the plurality of shelf tiers. The correction coefficient k1 is a coefficient for considering practicality of the shelf tiers (for example, the shelf tiers may or may not have a spatial margin) according to the accommodated item. The wording of "according to the accommodated item" means that it changes depending on the accommodated items. For example, different correction coefficients k1 may be determined according to the item category or the item attribute of the accommodated item. For example, in a case where the accommodated item is clothes or is hardly damaged, it is considered that there is no problem even when a plurality of accommodated items are in close contact with each other and compressed. Therefore, the correction coefficient k1 of such accommodated item is relatively low (for example, 0.5). On the other hand, in a case where the accommodated item is food or is easily scratched, the correction coefficient k1 of such accommodated item becomes relatively high (for example, 1).

For example, the occupancy rate calculation unit 233 may calculate the corrected occupancy rate r1 by selecting the correction coefficient k1 according to the accommodated item on the basis of the item category or the item attribute of the accommodated items and by correcting the occupancy rate r0 with the selected correction coefficient k1. Accordingly, the corrected occupancy rate r1 can be calculated more efficiently. In this case, a table that defines correction coefficient k1 for each item category or item attribute of the accommodated items may be used. Or, a calculation formula in which the correction coefficient k1 is output by inputting the item category or the item attribute of the accommodated item may be used. Such calculation formula may be a learned model learned by using learning data that includes the item category or the item attribute of an item as input data and the correction coefficient k1 of the item as output data.

As described above, the lower the correction coefficient k1, the lower the calculated corrected occupancy rate r1 will be. Such corrected occupancy rate r1 (for example, 70%) means that there is room for the shelf tier to accommodate items. On the other hand, the higher the correction coefficient k1, the higher the calculated corrected occupancy rate r1 will be. Such corrected occupancy rate r1 (for example, 100%) means that there is no room for the shelf tier to accommodate items. Incidentally, in a case where a plurality of accommodated items having different correction coefficients k1 have been accommodated in the shelf tier, the corrected occupancy rate r1 may be calculated by correcting the occupancy rate r0 of the shelf tier by the correction coefficient k1 obtained by a weight average of the correction coefficients k1. Alternatively, in this case, a corrected occupancy rate r1' may be calculated by correcting the occupancy rate r0' of each shelf by each correction coefficient k1 for each shelf on which a plurality of accommodated items having the same correction coefficient k1 have been accommodated. In this case, for example, the average value or the maximum value of the corrected occupancy rates r1' of all shelves included in the shelf tier is the corrected occupancy rate r1 of the shelf tier.

On the basis of the corrected occupancy rate r1 for each shelf tier calculated by the occupancy rate calculation unit 233, the recommended shelf tier identifying unit 234 identifies, among the plurality of shelf tiers, a recommended shelf tier to be recommended to accommodate the unaccommodated item that has not yet been accommodated in the shelf tiers. As a result, an appropriate recommended shelf tier can be identified. For example, an upper constant (predetermined number) of shelf tiers having a relatively small corrected occupancy rate r1 (including a shelf tier with the smallest corrected occupancy rate r1) are identified as the recommended shelf tiers. Moreover, the recommended shelf tier identifying unit 234 may preferentially identify a shelf tier close to the shipping place of the item (for example, the shelf tier closest to the shipping place) among a plurality of shelf tiers having a relatively small corrected occupancy rate r1 as the recommended shelf tier. Furthermore, the recommended shelf tier identifying unit 234 may acquire the record of shipping the accommodated items from the shelf tier (the record of shipping the accommodated items from each of the plurality of shelves included in the shelf tier), and calculate an item turnover rate for each shelf tier on the basis of the record. In this case, the recommended shelf tier identifying unit 234 may identify the recommended shelf tier to be recommended to accommodate the unaccommodated item on the basis of the corrected occupancy rate r1 for each shelf tier and the item turnover rate for each shelf tier. Accordingly, it is possible to identify the appropriate recommended shelf tier in consideration of the item turnover rate. For example, an upper constant (predetermined number) of shelf tiers having a relatively small corrected occupancy rate r1 and a relatively high item turnover rate are identified as the recommended shelf tiers. Here, the item turnover rate is, for example, a ratio of the accommodated items shipped from the shelf tier during the past predetermined period (for example, 6 times/30 days).

Moreover, in a case where the shelf store-in prohibition condition is associated with any one of the plurality of shelf tiers, the recommended shelf tier identifying unit 234 may acquire the shelf store-in prohibition condition, and determine whether or not the unaccommodated item falls under the shelf store-in prohibition condition on the basis of the item information related to the unaccommodated item. In this case, the recommended shelf tier identifying unit 234 excludes the shelf tier for which the unaccommodated item is determined to fall under the shelf store-in prohibition condition, and identifies the recommended shelf tier in which the accommodation of the unaccommodated item should be recommended. Thus, the shelf tier that should not be identified as the recommended shelf tier can be efficiently excluded. For example, when the unaccommodated item is not the item of the exhibitor identified by the exhibitor ID defined in the shelf store-in prohibition condition associated with any shelf tier, it is determined that the unaccommodated item falls under the shelf store-in prohibition condition.

On the basis of the corrected occupancy rate r1' for each shelf calculated by the occupancy rate calculation unit 233, the recommended shelf identifying unit 235 identifies the recommended shelf to be recommended to accommodate the unaccommodated item that has not yet been accommodated in a shelf tier among the plurality of shelves. Thus, an appropriate recommended shelf can be identified. For example, an upper constant (predetermined number) of shelves having a relatively small corrected occupancy rate r1' (including a shelf with the smallest corrected occupancy rate r1') is identified as the recommended shelf. Furthermore, the recommended shelf identifying unit 235 may acquire the record of shipping the accommodated items from the shelves, and calculate the item turnover rate for each shelf on the basis of the record. In this case, the recommended shelf identifying unit 235 may identify the recommended shelf on which the accommodation of the unaccommodated item should be recommended on the basis of the corrected occupancy rate r1' for each shelf and the item turnover rate for each shelf. Thus, it is possible to identify the appropriate recommended shelf in consideration of the item turnover rate. For example, an upper constant (predetermined number) of shelves having a relatively small corrected occupancy rate r1' and a relatively high item turnover rate are identified as the recommended shelves. Here, the item turnover rate is, for example, a ratio of the accommodated items shipped from the shelf during the past predetermined period.

Moreover, in a case where the shelf store-in prohibition condition is associated with any one of the plurality of shelves, the recommended shelf identifying unit 235 may acquire the shelf store-in prohibition condition and determine whether or not the unaccommodated item falls under the shelf store-in prohibition condition on the basis of the item information related to the unaccommodated item. In this case, the recommended shelf identifying unit 235 excludes the shelf for which the unaccommodated item is determined to fall under the shelf store-in prohibition condition, and identifies the recommended shelf on which the accommodation of the unaccommodated item should be recommended. Thus, the shelf that should not be identified as the recommended shelf can be efficiently excluded. For example, when the weight of the unaccommodated item is equal to or greater than the threshold value defined in the shelf store-in prohibition condition associated with the upper-tier shelf, it is determined that the unaccommodated item falls under the shelf store-in prohibition condition. Therefore, the shelf (for example, the upper-tier shelf) for which the unaccommodated item is determined to fall under the shelf store-in prohibition condition is excluded (that is, it is excluded from the recommended shelf), and the recommended shelf is identified. Moreover, when the unaccommodated item is not the item of the exhibitor identified by the exhibitor ID defined in the shelf store-in prohibition condition associated with any shelf, it is determined that the unaccommodated item falls under the shelf store-in prohibition condition.

Figure 5A:
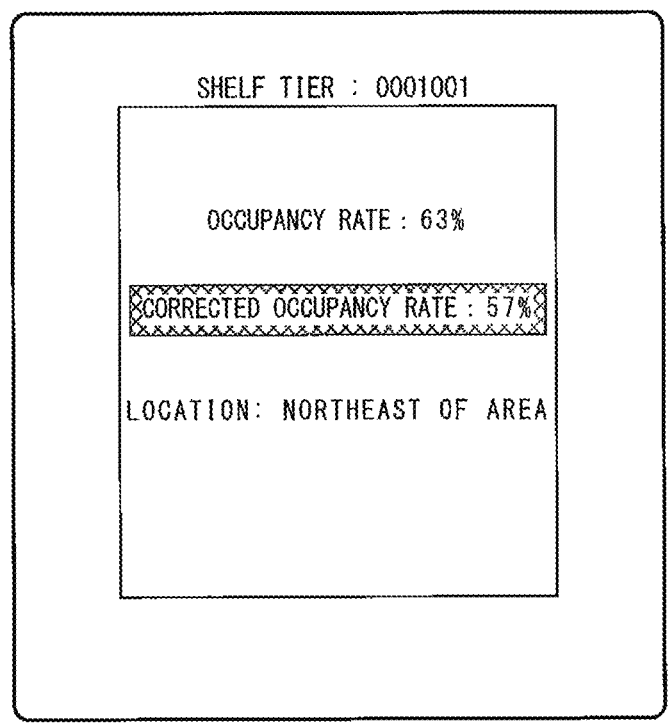
FIG. 5A is a diagram illustrating a display example of information on a shelf tier.

The information presentation unit 236 transmits, via the communication unit 21, information on the shelf tier including the corrected occupancy rate r1 calculated by the occupancy rate calculation unit 233 to the worker terminal 1 of the worker who performs work of accommodating the unaccommodated item in the shelf tier, thereby displaying the information on the working screen. As a result, the information on the shelf tier is presented to the worker before the work. This makes it possible to allow the worker to intuitively grasp an appropriate shelf tier for accommodating the unaccommodated item before the worker accommodates the unaccommodated item in the shelf tier. FIG. 5A is a diagram illustrating a display example of the information on the shelf tier. In the example of FIG. 5A, in addition to the corrected occupancy rate r1, the shelf tier ID (which may be the name of the shelf tier), the occupancy rate r0, and the installation position (LOCATION: NORTHEAST OF AREA) of the shelf tier in the predetermined area are displayed as the information on the shelf tier. Here, the occupancy rate r0 and the corrected occupancy rate r1 are displayed in a distinguishable display mode. Accordingly, it is possible to cause the worker to grasp the difference between the occupancy rate r0 and the corrected occupancy rate r1 before the worker accommodates the unaccommodated item in the shelf tier.

Moreover, the information presentation unit 236 may display the information on the shelf including the corrected occupancy rate r1' calculated by the occupancy rate calculation unit 233 on the working screen by transmitting the information to the worker terminal 1. As a result, the information on the shelf is presented to the worker before the work. This makes it possible to allow the worker to intuitively grasp an appropriate shelf for accommodating the unaccommodated item before the worker accommodates the unaccommodated item in the shelf tier. FIG. 5B is a diagram illustrating a display example of the information on the shelves. In the example of FIG. 5B, in addition to the corrected occupancy rates r1', the shelf tier ID of the shelf tier, the occupancy rates r0', and positions of the shelves in the shelf tier (the upper tier, the middle tier, or the lower tier) are displayed as the information on the shelves. Here, the occupancy rates r0' and the corrected occupancy rates r1' are displayed in a distinguishable display mode. As a result, it is possible to cause the worker to grasp the difference between the occupancy rates r0' and the corrected occupancy rates r1' before the worker accommodates the unaccommodated item in the shelf tier.

Moreover, the information presentation unit 236 transmits information on the recommended shelf tier that is identified by the recommended shelf tier identifying unit 234 to the worker terminal 1 to display the information on the working screen. As a result, the information on the recommended shelf tier is presented to the worker before the work. This makes it possible for the worker to quickly grasp the recommended shelf tier. Incidentally, the information on the recommended shelf tier to be presented preferably includes the shelf tier ID (which may be the name of the shelf tier) of the recommended shelf tier, the installation position of the recommended shelf tier in the predetermined area, and a reason for recommending the recommended shelf tier (for example, the corrected occupancy rate of the shelf tier is low, or the item turnover rate of the shelf tier is high). Moreover, the information presentation unit 236 transmits information on the recommended shelf that is identified by the recommended shelf identifying unit 235 to the worker terminal 1 to display the information on the working screen. As a result, the information on the recommended shelf is presented to the worker before the work. Accordingly, this makes it possible for the worker to quickly grasp the recommended shelf. Incidentally, the information on the recommended shelf to be presented preferably includes the shelf ID of the recommended shelf, the position of the recommended shelf in the shelf tier, and a reason for recommending the recommended shelf (for example, the corrected occupancy rate of the shelf is low, or the item turnover rate of the shelf is high).

Figure 6:
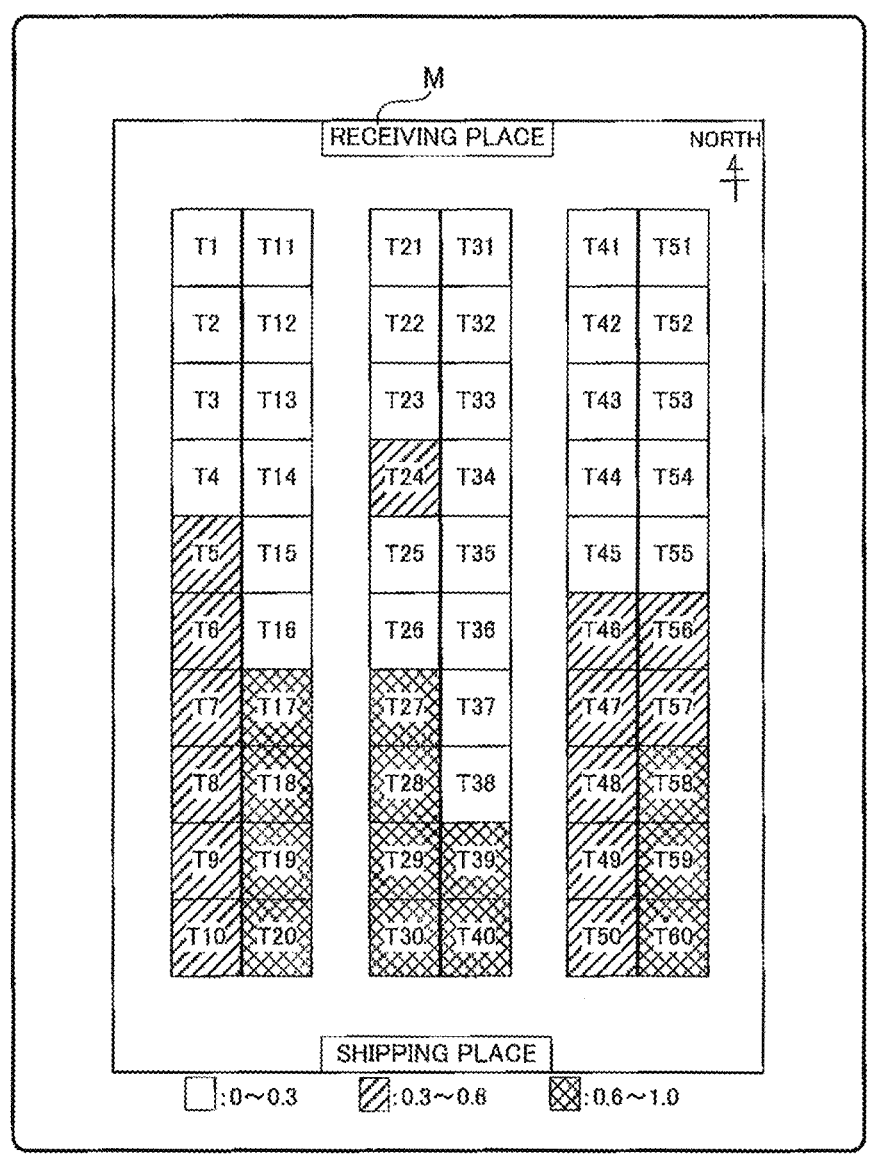
FIG. 6 is a diagram illustrating a display example of an area map.

Moreover, in a case where the corrected occupancy rate r1 for each shelf tier is calculated by the occupancy rate calculation unit 233, the information presentation unit 236 transmits, to the worker terminal 1, data of an area map, thereby displaying the area map on the working screen. As a result, the area map is presented to the worker before the work. Here, in the area map, the corrected occupancy rate r1 calculated for each shelf tier is associated with the installation position of each shelf tier. Or, in the area map, a display object according to the corrected occupancy rate r1 calculated for each shelf tier is associated with the installation position of each shelf tier. FIG. 6 is a diagram illustrating a display example of the area map. In an area map M illustrated in FIG. 6, display objects T1 to T60 according to the corrected occupancy rates r1 are displayed in accordance with the installation positions of the plurality of shelf tiers. In the example of FIG. 6, the display modes of the display objects T1 to T60 are distinguished by three patterns according to the corrected occupancy rate r1 being small (0 to 0.3), medium (0.3 to 0.6), and large (0.6 to 1.0). This makes it possible to allow the worker to intuitively grasp the installation position of an appropriate shelf tier for accommodating the unaccommodated item (for example, a shelf tier with low corrected occupancy rate r1) before the worker accommodates the unaccommodated item in the shelf tier. Incidentally, in the area map M illustrated in FIG. 6, the position of the recommended shelf tier identified by the recommended shelf tier identifying unit 234 may be displayed with a character (may be an image or a mark) that is recognizable to the worker. Accordingly, the worker can quickly grasp the installation position of the recommended shelf tier.

[2. Operation of Shelf Tier Management System S]

Next, an example of an operation performed in the shelf tier management system S will be described with reference to FIG. 7. FIG. 7 is a flowchart illustrating an example of processing of the control unit 23 in the shelf tier management server 2. Incidentally, as a premise of the operation to be described below, the shelf tier management server 2 transmits, to the worker terminal 1 via the network NW, item information (for example, the item ID and the item category of the unaccommodated item) on one or a plurality of unaccommodated items that have arrived (i.e., have been received) at the warehouse and have been instructed to be accommodated in a shelf tier. Accordingly, the item information related to the unaccommodated item is displayed on the working screen of the worker terminal 1 in a selectable manner. Then, when the worker selects one unaccommodated item (for example, an item to be accommodated) displayed on the working screen, the worker terminal 1 transmits an information presentation request to the shelf tier management server 2 via the network NW. The information presentation request includes the item ID of the unaccommodated item selected by the worker.

The process illustrated in FIG. 7 is started when the information presentation request is received from the worker terminal 1 through the communication unit 21. When the processing shown in FIG. 7 is started, the control unit 23 of the shelf tier management server 2 acquires, from the item information database 221, the item information related to the unaccommodated item selected by the worker (that is, the unaccommodated item identified by the item ID included in the information presentation request) in response to the information presentation request (step S1).

Next, the control unit 23 selects, from the shelf tier information database 222 corresponding to the warehouse, a shelf tier that is a candidate for accommodating the unaccommodated item among the shelf tiers installed in the warehouse where the unaccommodated item has arrived, and acquires the shelf tier information related to the shelf tier (step S2). Such shelf tier information includes, for example, the size information of each shelf included in the shelf tier, the position information of each shelf, the item ID and the number of accommodated items that have been accommodated in each shelf, and the record of shipping the accommodated items from each shelf. Such shelf tier information may include the shelf store-in prohibition condition.

Next, on the basis of the item IDs of one or more accommodated items included in the shelf tier information acquired in step S2, the control unit 23 acquires the item information related to the accommodated items from the item information database 221 (step S3). Such item information includes, for example, the item category of the accommodated items, the item attribute of the accommodated items, the item size information of the accommodated items, the weight of the accommodated items, and the exhibitor information of the accommodated items that have been accommodated in each shelf included in the shelf tier.

Next, the control unit 23 (occupancy rate calculation unit 233) calculates the occupancy rate r0' of each shelf included in the shelf tier and the occupancy rate r0 of the shelf tier as described above on the basis of the size information of the shelf tier, acquired in step S2 and the size information of the accommodated items, acquired in step S3 (step S4).

Next, the control unit 23 (the occupancy rate calculation unit 233) determines whether or not the occupancy rate r0 of the shelf tier is equal to or greater than a threshold (for example, 101%) (step S5). In a case where it is determined that the occupancy rate r0 of the shelf tier is equal to or greater than the threshold (step S5: YES), the process proceeds to step S6. Accordingly, even in a case where the occupancy rate of the shelf tier is high, it is possible to leave more room for accommodating the unaccommodated item. Moreover, when the occupancy rate of the shelf tier is equal to or greater than the threshold, a calculation load can be reduced by calculating the corrected occupancy rate to be described later. On the other hand, in a case where it is determined that the occupancy rate r0 of the shelf tier is not equal to or greater than the threshold (step S5: NO), the process proceeds to step S8. Incidentally, step S5 may be omitted, and the process may proceed to step S6 regardless of the occupancy rate r0 of the shelf tier.

In step S6, the control unit 23 (the occupancy rate calculation unit 233) selects the correction coefficient k1 according to the accommodated item on the basis of the item category or the item attribute of the accommodated item. Here, when there are a plurality of types of accommodated items, the correction coefficient k1 of each accommodated item is selected. Next, the control unit 23 (the occupancy rate calculation unit 233) calculates the corrected occupancy rate r1' of each shelf by correcting the occupancy rate r0' of each shelf calculated in step S4 by the correction coefficient k1 selected in step S6, and further calculates the average value or maximum value of the corrected occupancy rates r1' of all the shelves as the corrected occupancy rate r1 of the shelf tier (step S7), and the process proceeds to step S8.

In step S8, the control unit 23 determines whether or not there is a shelf associated with the shelf store-in prohibition condition among the plurality of shelves for which the corrected occupancy rates r1' have been calculated in step S7. In a case where it is determined that there is the shelf associated with the shelf store-in prohibition condition (step S8: YES), the process proceeds to step S9. On the other hand, in a case where it is determined that there is no shelf associated with the shelf store-in prohibition condition (step S8: NO), the process proceeds to step S12.

In step 39, the control unit 23 selects one shelf associated with the shelf store-in prohibition condition. Next, the control unit 23 determines whether or not the unaccommodated item falls under the shelf store-in prohibition condition associated with the shelf selected in step S9 on the basis of the item information related to the unaccommodated item (step S10). In a case where it is determined that the unaccommodated item falls under the shelf store-in prohibition condition (step S10: YES), the shelf selected in step S9 is identified as an exclusion target (step S11), and the process returns to step S8. On the other hand, in a case where it is determined that the unaccommodated item does not fall under the shelf store-in prohibition condition (step 310: NO), the process returns to step S8.

After returning to step S8, it is determined whether there is a shelf that has not been selected in step S9 among the plurality of shelves for which the corrected occupancy rates r1' have been calculated in step S7. Then, in a case where it is determined that such a shelf exists, the process proceeds to step S9, and a process similar to the above one is performed.

In step S12, the control unit 23 (the recommended shelf identifying unit 235) identifies the recommended shelf on which the accommodation of the unaccommodated item should be recommended as described above, among the shelves other than the shelf identified as an exclusion target on the basis of the corrected occupancy rate r1' of the shelf other than the shelf identified as the exclusion target in step S11. For example, on the basis of the corrected occupancy rate r1' for each shelf and the item turnover rate for each shelf, the recommended shelf identifying unit 235 may identify a shelf with the highest item turnover rate among the shelves with the corrected occupancy rate r1' equal to or less than the threshold as the recommended shelf. Incidentally, there are cases where the recommended shelf is not identified.

Next, the control unit 23 determines whether there is a shelf tier that has not been selected as a candidate for accommodating the unaccommodated item among the shelf tiers installed in the warehouse where the unaccommodated item has arrived (step S13). In a case where it is determined that there is a shelf tier that has not been selected as a candidate for accommodating the unaccommodated item (step S13: YES), the process returns to step S2, and a process similar to the above one is performed. On the other hand, in a case where it is determined that there is no shelf tier that has not been selected as a candidate for accommodating the unaccommodated item (step 313: NO), the process proceeds to step S14.

In step S14, the control unit 23 determines whether or not there is a shelf tier associated with the shelf store-in prohibition condition among the shelf tiers for which the corrected occupancy rates r1 have been calculated in step S7. In a case where it is determined that there is a shelf tier associated with the shelf store-in prohibition condition (step S14: YES), the process proceeds to step S15. On the other hand, in a case where it is determined that there is no shelf tier associated with the shelf store-in prohibition condition (step S14: NO), the process proceeds to step S18.

In step S15, the control unit 23 selects one shelf tier associated with the shelf store-in prohibition condition. Next, the control unit 23 determines whether or not the unaccommodated item falls under the shelf store-in prohibition condition associated with the shelf tier selected in step 315 on the basis of the item information related to the unaccommodated item (step S16). In a case where it is determined that the unaccommodated item falls under the shelf store-in prohibition condition (step S16: YES), the shelf tier selected in step S15 is identified as an exclusion target (step S17), and the process returns to step S14. Incidentally, the shelf tier for which the recommended shelf is not identified in step S12 may also be identified as an exclusion target. On the other hand, when it is determined that the unaccommodated item does not fall under the shelf store-in prohibition condition (step S16: NO), the process returns to step S14.

After returning to step S14, it is determined whether there is a shelf tier for which the corrected occupancy rate r1 has been calculated in step S7 and which has not been selected in step 315. Then, in a case where it is determined that such a shelf tier exists, the process proceeds to step S15, and a process similar to the above one is performed.

In step S18, the control unit 23 (the recommended shelf tier identifying unit 234) identifies the recommended shelf tier in which the accommodation of the unaccommodated item should be recommended as described above, among the shelf tiers other than the shelf tier identified as the exclusion target on the basis of the corrected occupancy rates r1 of the shelf tiers other than the shelf tier identified as the exclusion target in step S17. For example, on the basis of the corrected occupancy rate r1 for each shelf tier and the item turnover rate for each shelf tier, the recommended shelf tier identifying unit 234 may identify the shelf tier having the highest item turnover rate among the shelf tiers having the corrected occupancy rates r1 equal to or less than the threshold as the recommended shelf tier. Here, instead of the shelf tier having the highest item turnover rate, the shelf tier closest to the shipping place may be used. Incidentally, there are cases where the recommended shelf tier is not identified.

Next, the control unit 23 (the information presentation unit 236) executes information presentation processing (step S19). In this information presentation processing, the control unit 23 (the information presentation unit 236) transmits the data of the area map including the information on the shelf tier for which the corrected occupancy rate r1 is calculated in step S7 to the worker terminal 1 via the network NW. Accordingly, for example, the area map M as illustrated in FIG. 6 is displayed on the working screen of the worker terminal 1. On the area map M, the display object of the shelf tier for which the corrected occupancy rate r1 has been calculated in step 37 (may be a display object according to the corrected occupancy rate r1) and the corrected occupancy rate r1 are displayed. Incidentally, when the recommended shelf tier is identified in step 318, a character or mark indicating the installation position of the recommended shelf tier is displayed on the area map M of the working screen.

When the worker designates a display object of a desired shelf tier among the display objects displayed in this manner, the worker terminal 1 transmits an information presentation request to the shelf tier management server 2 via the network NW. The information presentation request includes the shelf tier ID of the shelf tier designated by the worker. Upon receiving the information presentation request, the shelf tier management server 2 transmits information on each shelf included in the shelf tier designated by the worker (that is, the shelf tier identified by the shelf tier ID included in the information presentation request) to the worker terminal 1 via the network NW in response to the information presentation request. Accordingly, for example, as illustrated in FIG. 5B, the occupancy rate r0', the corrected occupancy rate r1', and the position of each shelf are displayed on the working screen of the worker terminal 1. Incidentally, in a case where the recommended shelf is identified in step 312, a character or mark indicating the position of the recommended shelf is displayed on the working screen.

As described above, according to the above embodiment, the shelf tier management system S is configured to acquire the size information of the shelf tier and the size information of the accommodated item that is accommodated in the shelf tier, to obtain the occupancy rate of the accommodated item in the shelf tier on the basis of at least the size information of the shelf tier and the size information of the accommodated item, and to calculate the corrected occupancy rate by correcting the occupancy rate with the correction coefficient according to the accommodated item. Therefore, even in a case where the degree of being regarded as a vacancy is different depending on the accommodated item, it is possible to calculate an appropriate occupancy rate according to the accommodated item that has been accommodated in the shelf tier. Accordingly, it is possible to increase an area provided for item inventory storage in the warehouse, optimize the inventory storage, and increase storage efficiency, and thereby contributing to warehouse service improvement. Furthermore, according to the above embodiment, since the information such as the corrected occupancy rate calculated as described above and the recommended shelf tier based on the corrected occupancy rate is presented to the worker before the work, it is possible to allow the worker to intuitively grasp the shelf tier having a low corrected occupancy rate or the like, and it is possible to appropriately accommodate the unaccommodated item in the shelf tier having a relatively low corrected occupancy rate or the like.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, the information on the shelf tier is transmitted to the worker terminal 1 of the worker, but the information including the above-described corrected occupancy rate may be transmitted to, for example, a terminal of a manager in charge of inventory storage of items. In this case, since the information including the corrected occupancy rate is displayed on a manager screen, the manager can more efficiently perform tasks related to inventory storage, recording of item receipt, and the like.

Moreover, in a case where one shelf has a plurality of frontages, the size information of the shelf acquired in the above embodiment may include the size information of each frontage included in the shelf. In this case, the occupancy rate calculation unit 233 may calculate a volumetric capacity of each frontage from the size information of each frontage included in the shelf, and calculate a sum of the calculated volumetric capacitys of the frontages as the volumetric capacity of the shelf. Alternatively, the occupancy rate calculation unit 233 may obtain the occupancy rate of the accommodated item in the frontage for each frontage by dividing the volume of the accommodated item that is accommodated in the frontage by the volumetric capacity of the frontage, and calculate the average value or maximum value of the occupancy rates of all frontages included in the shelf as the occupancy rate of the shelf. Moreover, the occupancy rate calculation unit 233 may calculate the corrected occupancy rate by correcting the occupancy rate of each frontage by each correction coefficient for each frontage accommodating a plurality of accommodated items having the same correction coefficient. In this case, the average value or maximum value of the corrected occupancy rates of the frontages is the corrected occupancy rate of the shelf. Moreover, the information presentation unit 236 may present information on the frontage (such as the position on the shelf) including the corrected occupancy rate of the frontage that is calculated by the occupancy rate calculation unit 233 to the worker before the work.

REFERENCE SIGNS LIST

1 Worker terminal
2 Shelf tier management server
11 Communication unit
12 operation/display unit
13 Storage unit
14 Control unit
21 Communication unit
22 Storage unit
23 Control unit
231 Shelf tier size acquisition unit
232 Item size acquisition unit
233 Occupancy rate calculation unit
234 Recommended shelf tier identifying unit
235 Recommended shelf identifying unit
236 Information presentation unit
NW Network
S Shelf tier management system

What is claimed is:

1. A shelf storage management system comprising:
a plurality of shelf tiers in an area;
a worker terminal comprising:
at least one terminal memory storing terminal program code; and
at least one terminal processor configured to access the terminal program code and to operate as instructed by the terminal program code; and
a shelf tier management system comprising:
a communication unit configured to communicate with the worker terminal;
at least one system memory storing an item information database, a shelf tier information database, and system program code; and
at least one system processor configured to access the item information database, the shelf tier information database, and the system program code and to operate as instructed by the system program code, the system program code including:
first acquisition code configured to cause at least one of the at least one system processor to acquire, from the shelf tier information database, size information of each of the plurality of shelf tiers;
second acquisition code configured to cause at least one of the at least one system processor to acquire, from at least one of the item information database and the shelf tier information database, size information of a respective accommodated item that is accommodated in each of the plurality of shelf tiers;
calculation code configured to cause at least one of the at least one system processor to obtain an occupancy rate of the respective accommodated item in each of the plurality of shelf tiers based on at least the size information of the respective shelf tier and the size information of the respective accommodated item, and to calculate a corrected occupancy rate for each of the plurality of the shelf tiers by correcting the respective occupancy rate with a correction coefficient according to the respective accommodated item;
first identifying code configured to cause at least one of the at least one processor to identify, based on the corrected occupancy rate of each of the plurality of shelf tiers, a recommended one or more shelf tiers, among the plurality of shelf tiers, to accommodate an unaccommodated item that is not yet accommodated in the plurality of shelf tiers, and
presentation code configured to cause at least one of the at least one system processor to cause the communication unit to transmit information regarding the recommended one or more shelf tiers to the worker terminal,
wherein the terminal program code comprises:
area map generation code configured to cause at least one of the at least one terminal processor to generate an area map comprising an installation position of each of the plurality of shelf tiers, the corrected occupancy rate for each of the plurality of shelf tiers, and the information regarding the recommended one or more shelf tiers, and
display code configured to cause at least one of the at least one terminal processor to display the area map on a display of the worker terminal.

2. The shelf storage management system of claim 1, wherein the calculation code causes the at least one processor to calculate the corrected occupancy rate in a case where the occupancy rate is equal to or greater than a threshold.

3. The shelf storage management system of claim 1,
wherein the presentation code is further configured to cause at least one of the at least one system processor to cause the communication unit to transmit the occupancy rate of each of the plurality of shelf tiers to the worker terminal, and
wherein the area map further comprises both the occupancy rate and the corrected occupancy rate for one or more of the plurality of shelf tiers.

4. The shelf storage management system of claim 1,
wherein the item information database comprises one or more of an item category or an item attribute of the accommodated item of each respective accommodated item, and wherein the calculation code is further configured to cause at least one of the at least one system processor to select each respective correction coefficient based on an item category or an item attribute of the respective accommodated item, and to correct each respective occupancy rate with the respective selected correction coefficient.

5. The shelf storage management system of claim 1, wherein the first identifying code is further configured to cause at least one of the at least one system processor to determine whether the unaccommodated item falls under a shelf store-in prohibition condition associated with any of the plurality of shelf tiers based on item information related to the unaccommodated item obtained from the item information database, and to identify the recommended one or more shelf tiers by excluding a shelf tier among the plurality of shelf tiers for which the unaccommodated item is determined to fall under the shelf store-in prohibition condition.

6. The shelf storage management system of claim 1,
wherein the shelf tier information database comprises item turnover rate information including shipping records for items accommodated on the plurality of shelf tiers, and
wherein the first identifying code is further configured to cause at least one of the at least one system processor to identify the recommended one or more shelf tiers based on the corrected occupancy rates for the plurality of shelf tiers and the item turnover rate information.

* * * * *